(12) United States Patent
Laroia et al.

(10) Patent No.: US 7,450,543 B2
(45) Date of Patent: Nov. 11, 2008

(54) METHODS AND APPARATUS FOR WIRELESS NETWORK CONNECTIVITY

(75) Inventors: Rajiv Laroia, Basking Ridge, NJ (US); Junyi Li, Bedminster, NJ (US); M. Scott Corson, Chatham, NJ (US)

(73) Assignee: Qualcomm Incorporated, San Diego, CA (US)

( * ) Notice: Subject to any disclaimer, the term of this patent is extended or adjusted under 35 U.S.C. 154(b) by 995 days.

(21) Appl. No.: 10/217,791

(22) Filed: Aug. 13, 2002

(65) Prior Publication Data

US 2003/0035410 A1 Feb. 20, 2003

Related U.S. Application Data

(60) Provisional application No. 60/312,126, filed on Aug. 14, 2001.

(51) Int. Cl.
*H04J 3/06* (2006.01)
*H04Q 7/00* (2006.01)
*H04B 7/00* (2006.01)

(52) U.S. Cl. .................. 370/331; 370/350; 370/503; 375/260; 375/356; 455/436; 455/502

(58) Field of Classification Search ................. 370/331, 370/350, 503; 375/260, 356; 455/436, 502
See application file for complete search history.

(56) References Cited

U.S. PATENT DOCUMENTS 4,696,052 A 9/1987 Breeden

| | | | |
|---|---|---|---|
| 5,388,102 A * | 2/1995 | Griffith et al. | 370/512 |
| 5,802,044 A * | 9/1998 | Baum et al. | 370/330 |
| 5,809,426 A * | 9/1998 | Radojevic et al. | 455/502 |

(Continued)

FOREIGN PATENT DOCUMENTS

EP 0511614 11/1992

(Continued)

OTHER PUBLICATIONS

European Search Report EP02757093, European Search Authority, Berlin, Feb. 28, 2008.

(Continued)

*Primary Examiner*—Alpus H Hsu
(74) *Attorney, Agent, or Firm*—Michael P. Straub; Kam T. Tam; Thomas R. Rouse

(57) ABSTRACT

Methods and apparatus which allow a wireless terminal (302) to simultaneously maintain connections with multiple base stations (304, 306) are described. Each wireless terminal (302) is capable of supporting multiple separate timing and/or other control loops one, for each base station connection thereby allowing the connections to operate independently and in parallel. Different control signals and/or data are transmitted on each connection that is established with a base station (302, 306). In this manner base stations (302, 306) receive different data allowing for asynchronous data transmission. The data received by the base stations (302, 306) can be supplied to a wired asynchronous network (308) without the need to combine the received data prior to supplying it to the wired network (308). The communications techniques of the invention can be used to implement soft handoffs without the need to duplicate data transmissions to multiple base stations.

45 Claims, 10 Drawing Sheets

U.S. PATENT DOCUMENTS

| | | | |
|---|---|---|---|
| 5,867,478 A * | 2/1999 | Baum et al. | 370/203 |
| 5,875,402 A * | 2/1999 | Yamawaki | 455/502 |
| 5,883,888 A | 3/1999 | St-Pierre | |
| 5,914,948 A * | 6/1999 | Frank | 370/337 |
| 5,920,557 A * | 7/1999 | Hirata | 370/350 |
| 5,953,324 A * | 9/1999 | Adachi | 370/331 |
| 6,038,450 A * | 3/2000 | Brink et al. | 455/442 |
| 6,108,313 A | 8/2000 | Lee et al. | |
| 6,112,088 A * | 8/2000 | Haartsen | 455/437 |
| 6,119,016 A * | 9/2000 | Matusevich | 455/502 |
| 6,208,871 B1 * | 3/2001 | Hall et al. | 455/517 |
| 6,215,982 B1 * | 4/2001 | Trompower | 455/63.3 |
| 6,216,004 B1 * | 4/2001 | Tiedemann et al. | 455/442 |
| 6,263,204 B1 | 7/2001 | Kusaki et al. | |
| 6,307,849 B1 * | 10/2001 | Tiedemann, Jr. | 370/335 |
| 6,370,160 B1 * | 4/2002 | Knutson et al. | 370/503 |
| 6,373,834 B1 * | 4/2002 | Lundh et al. | 370/350 |
| 6,477,183 B1 * | 11/2002 | Yamamoto | 370/508 |
| 6,735,241 B1 * | 5/2004 | Fujita | 375/149 |
| 6,754,495 B2 * | 6/2004 | Kusaki et al. | 455/436 |
| 6,868,520 B1 * | 3/2005 | Fauconnier | 714/790 |
| 6,892,059 B1 * | 5/2005 | Kim et al. | 455/272 |
| 6,967,936 B1 | 11/2005 | Laroia et al. | |
| 7,002,934 B2 * | 2/2006 | Dolgonos et al. | 370/328 |
| 7,042,858 B1 * | 5/2006 | Ma et al. | 370/331 |
| 2002/0122396 A1 * | 9/2002 | Terasawa | 370/331 |
| 2002/0126706 A1 | 9/2002 | Laroia et al. | |

FOREIGN PATENT DOCUMENTS

| | | |
|---|---|---|
| EP | 1030477 | 8/2000 |
| EP | 1079653 | 2/2001 |
| JP | 10-032881 | 3/1998 |
| JP | 2001-036937 | 2/2001 |
| WO | 9628918 | 9/1996 |

OTHER PUBLICATIONS

International Search Report-PCT/US02/025711, International Search Authority US, Dec. 4, 2002.

* cited by examiner

US 7,450,543 B2

METHODS AND APPARATUS FOR WIRELESS NETWORK CONNECTIVITY

RELATED APPLICATIONS

The present application claims the benefit of the filing date of U.S. Provisional Patent Application Ser. No. 60/312,126 filed Aug. 14, 2001 titled: "A METHOD FOR PROVIDING NETWORK CONNECTIVITY FOR A WIRELESS TERMINAL" and which is hereby expressly incorporated by reference.

FIELD OF THE INVENTION

The present invention is directed to communication systems, and more particularly, to methods and apparatus for supporting communication between a wireless terminal, e.g., mobile node, and multiple bases stations.

BACKGROUND OF THE INVENTION

In a wireless communication system, a wireless terminal, e.g., mobile node, is often coupled to a wired network, such as the Internet, via base stations. Base stations provide network connectivity within a coverage area called a cell. The communications path from a base station to the wireless terminal is called a "downlink", while a communications path from the wireless terminal to a base station is called an "uplink".

For the purpose of network connectivity, at a minimum, the wireless terminal communicates with one base station. However, for various performance considerations typically in support of terminal mobility, e.g., moving from cell to cell, wireless terminals are often equipped to simultaneously maintain wireless link connections with multiple base stations. For example, in a Code Division Multiple Access (CDMA) system, the wireless terminal can be in a "soft handoff" state.

FIG. 1 illustrates a known CDMA communications network 100, which includes wireless terminal 102, base station 1 104, base station 2 106, mobile switching center 108 and wired networks 110. Various communications between the network elements are represented by arrows. Uplink communications are illustrated in FIG. 1 and downlink communications are illustrated in FIG. 2.

The existing method of soft handoff in direct spread CDMA technologies delivers a single data information flow split across multiple link connections, each from a different base station, to a wireless terminal, and another data flow from the terminal back to the multiple base stations. The consequent characteristics, including tight time synchronization of these connections between the base stations and the terminal, constrains the technology choice for use in a radio access network infrastructure.

Referring to FIG. 1, in the soft handoff state, using the uplink, the wireless terminal 102 transmits a signal 112, 114 representing information to be sent. In this example, the wireless terminal 102 is in the coverage area of more than one base station 104, 106. Therefore, more than one base station 104, 106 listens to the same uplink signal 112, 114 simultaneously.

Then, in response to receiving the signal 112, 114 from the wireless terminal 102, the base stations 104, 106 process received signals. As represented by arrows 116 and 118, the processing results are sent to a central unit, often referred to as a mobile switching center 108, which combines the results from individual base stations 104, 106 to obtain the sent information. Then the mobile switching center 108 sends the information to the wired network 110, e.g., the Internet. This is represented by arrow 120.

Similarly, in regard to the downlink, as illustrated in FIG. 2, the mobile switching center 108 receives information from the wired networks 110 for the wireless terminal 102, as represented by arrow 220. Then the mobile switching center 108 duplicates the information and transmits the information to more than one base station 104, 106. This is represented by arrows 216, 218. The base stations 104, 106 simultaneously transmit the received signal representing the information to the wireless terminal 102. This is shown using arrows 212 and 214. The wireless terminal 102 combines the signals received from the base stations 104, 106 to obtain the information from the wired networks 110.

One advantage of having the soft handoff state is to achieve macro diversity. In addition, the soft handoff state also reduces data loss and latency during handoff, i.e., when the wireless terminal is switched from one base station to another data is transmitted by multiple base stations.

Data received by a wireless terminal from a first base station can be combined with data received from a second wireless terminal which transmits the same signal to form a complete message or set of data even when communication with the first base station is lost, e.g., due to entry into the coverage area of the second base station.

Soft handoff has the disadvantage associated with the complexity and timing requirements of utilizing mobile switching center 108 as a combining unit in the uplink and as a duplicating unit in the downlink. This characteristic constrains network operations, since this characteristic requires synchronized network transport technology capable of delivering data information to and from the mobile switching center 108 and the base stations 104, 106 with very low delay jitter with respect to the multiple base stations 104, 106. That is, in such systems information to and from the multiple base stations 104, 106 and the mobile switching center 108 must be tightly synchronized in time. This synchronized-network transport characteristic stands in marked contrast to the operation of packet-switched data networks that typically utilize asynchronously-networked transport technologies.

In a mobile communication system, maintaining multiple link connections simultaneously is important to ensure seamless handoffs. However, there are compelling economic advantages in using more asynchronous forms of data networking technologies within radio access networks. Accordingly, there is a need for improved methods and apparatus for enabling wireless connectivity, at least some of which will allow the wireless terminals to be simultaneously connected with multiple base stations while enabling the base stations to communicate with the wired network in a way consistent with asynchronous, packet-switched data networking.

SUMMARY OF THE INVENTION

The present invention is directed to methods and apparatus which allow a wireless terminal to simultaneously maintain connections with multiple base stations.

The invention described here allows a wireless terminal to be simultaneously connected with multiple base stations in, e.g., an asynchronous network, yet being able to send different data and/or control information flows in each link connection from each base station to the terminal, and from the terminal back to the base stations. In this way simultaneous yet different information flows are possible between a wireless terminal and multiple base stations. There is no requirement for time synchronization between the link connections of the base stations communicating with the terminal. Consequently more technology options exist for use in the radio access network infrastructure.

In accordance with the invention, multiple simultaneous connections are independently operated. Connections may include each an uplink, a downlink or both an uplink and a downlink. In the physical layer, separate synchronization loops are individually tuned and used for each of the multiple connections. To facilitate simultaneous operation of independent timing synchronization loops used to support simultaneous communication with multiple base stations, multiple uplink and multiple down link receiver and timing synchronization circuits, may be included in each wireless terminal.

In the upper communications layers, the control, e.g., timing and power control signals and data information carried by distinct connections may be, and typically, are different.

With regard to connections established by a wireless terminal, the wireless terminal and the base stations have the choice of letting a set of downlinks and/or uplinks to be active and keeping the remaining links inactive. In various embodiments, for an active downlink or uplink, the wireless terminal has the choice of carrying data and/or control information flows on that link.

The wireless terminal is equipped with multiple pairs of transmitter and receiver circuits, where each transmitter/receiver pair is dedicated for a particular connection. Preferably, a plurality of transmitter/receiver pairs share the same analog device components, e.g., receiver/transmitter circuitry. In the exemplary embodiment, different connections are individually synchronized and separated in the digital domain.

A make-before-break handoff method implemented in accordance with the invention involves a wireless terminal maintaining multiple simultaneous, independent connections with both current and handoff candidate base stations before the connection with the current base station goes down. The connections with both the current and handoff candidate base stations are independently operated. During make-before-break handoff, the downlinks and uplinks of the multiple connections may remain active, and all may carry both control and data flows. However, due to system and/or terminal constraints, the aforementioned handoff behavior may also be restricted such that most or all the downlinks of the multiple connections are active and carry both control and data flows. While multiple uplinks are active and carry control flows at the same time for a given device, in one exemplary embodiment a single uplink is used to communicate the device's data flow at any given time.

Numerous additional features, benefits and details of the methods and apparatus of the present invention are described in the detailed description which follows.

DETAILED DESCRIPTION

Figure 1:
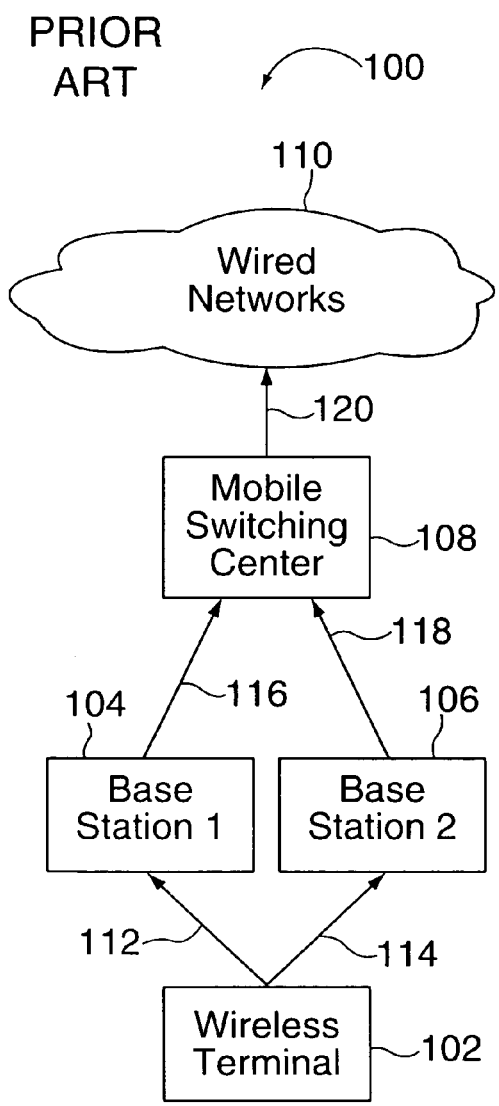
FIG. 1 illustrates a known communications system with uplink signaling during, e.g., a soft handoff.
Figure 2:
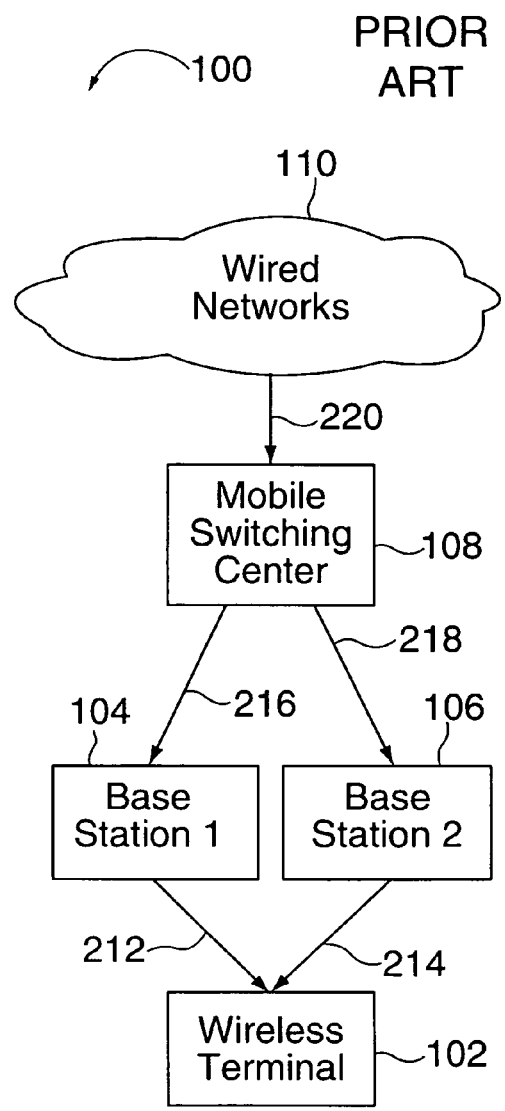
FIG. 2 illustrates a known communication system with downlink signaling during, e.g., a soft handoff.
Figure 3:
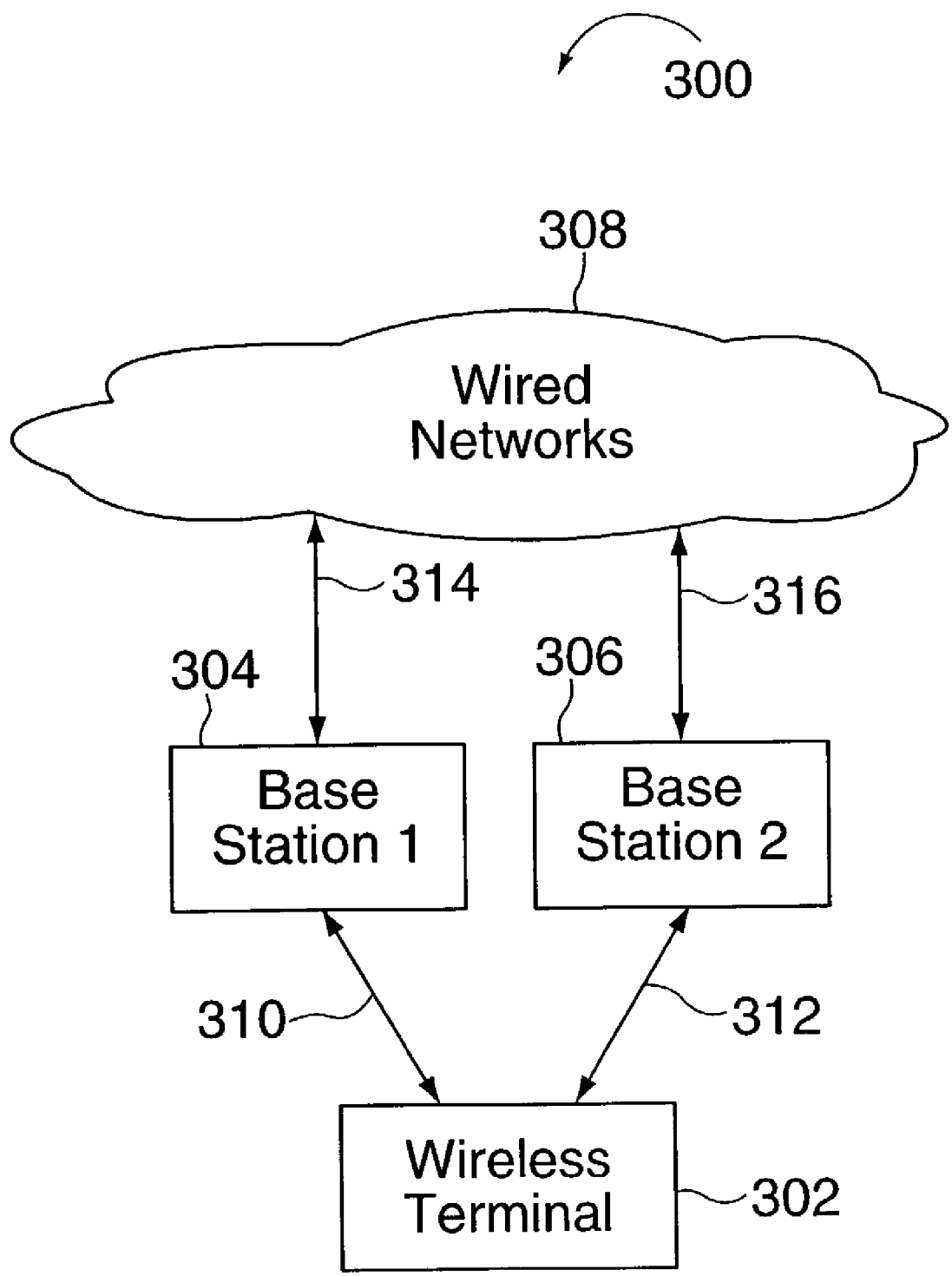
FIG. 3 illustrates a communications system implemented in accordance with an exemplary embodiment of the present invention.

FIG. 3 illustrates a communication system 300 implemented in accordance with the present invention. Communications system 300 includes wireless terminal 302, base station 1 304, base station 2 306, and wired networks 308. Communications between the system 300 elements are represented by arrows and will be described below.

The wireless terminal 302 is equipped to maintain multiple wireless connections with multiple base stations 304, 306 in parallel, e.g., simultaneously. A wireless connection links the wireless terminal 302 with a particular base station, e.g. base station 1 304, and is used to exchange data, network level and higher, and/or control, link and MAC layer, information, i.e., data flow and/or control flow, between the wireless terminal 302 and base station 1 304. In accordance with the invention the wireless terminal 302 can establish a wireless connection with more than one base station, e.g., base station 1 304 and base station 2 306. The technologies and/or spectrum used by distinct simultaneous connections can be the same or different.

In accordance with the invention, at any given time, the pieces of information carried by the distinct simultaneous connections between the wireless terminal 302 and the base stations 304, 306, can, and normally are, different. Therefore the connections that carry different information at the same time are independent connections or in other words information is carried on different channels.

FIG. 3 illustrates the two simultaneous and independent connections the wireless terminal 302 makes with the base stations 304, 306. These connections use the same available bandwidth, but use different communications channels so the connections do not interfere with each other. Arrows 310 and 312 represent the communications channels.

The method of multiple simultaneous independent connections is different from the method of soft handoff because of at least the following reason. In particular, in accordance with the invention, the signals exchanged between the wireless terminal 302 and multiple base stations 304, 306 carry different pieces of information, while in soft handoff the signals over the multiple links carry the same pieces of information. Since both channels carry separate information, a mobile switching center is not needed as a combining and/or duplicating unit. Therefore, in accordance with the invention, the base stations 304, 306 can be coupled to the wired networks 308 directly, individually and independently. This is represent in FIG. 3 by arrows 314 and 316.

A connection or channel is comprised of a pair of separate communications paths, a downlink and an uplink each of which carries separate information flows. The downlink, the uplink or both are active for a connection at any given time. Moreover, when a downlink or uplink is active, data and/or control signals, flows, are transmitted over the connection.

In accordance with the invention, the activities of distinct connections can be different, and when active, the types of information flows transmitted over distinct connections can be different. During any given time period in which multiple connections exist with a given wireless terminal 302, either the wireless terminal 302 or the base stations 304, 306 have the choice of dynamically setting a set of downlinks and/or uplinks to be active and, optionally, keeping the remaining inactive. For an active downlink or uplink, either the wireless terminal or the base stations have the choice of carrying data and/or control flows on that link. Various embodiments for connections settings will now be described.

Figure 4:
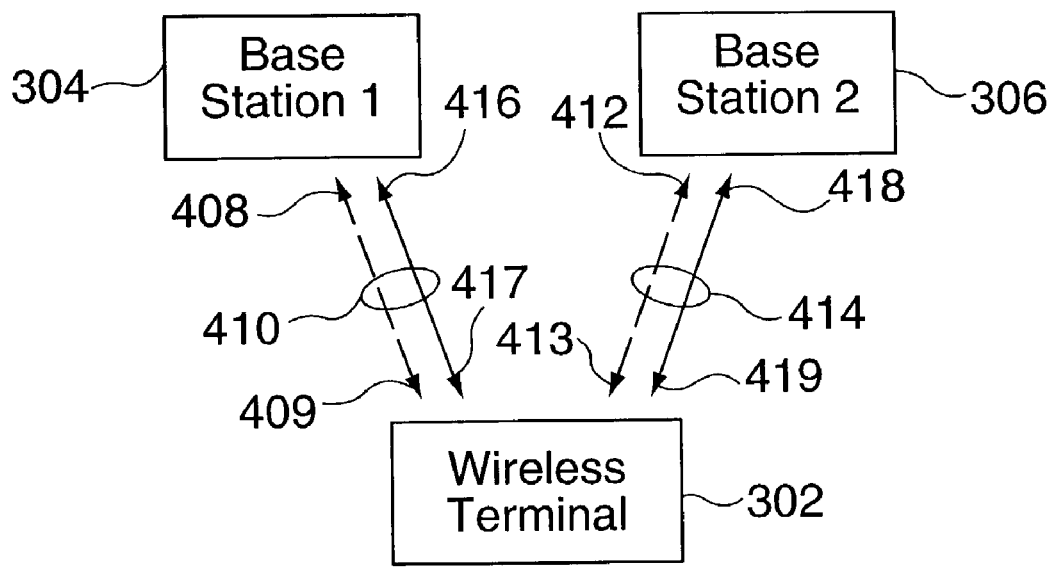
FIGS. 4-6 illustrate three embodiments of maintaining multiple network connections in accordance with the present invention.
Figure 5:
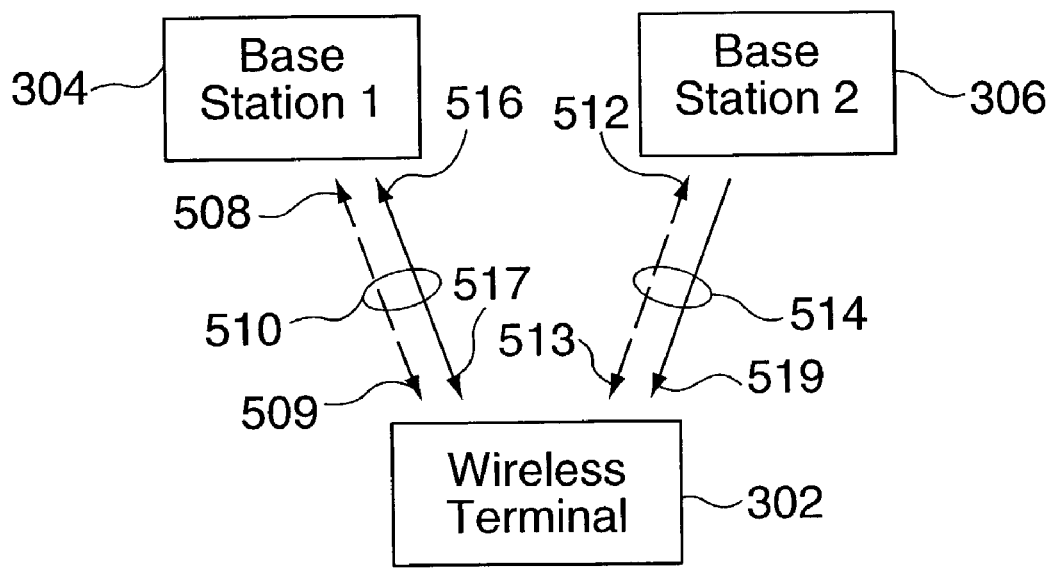
Figure 6:
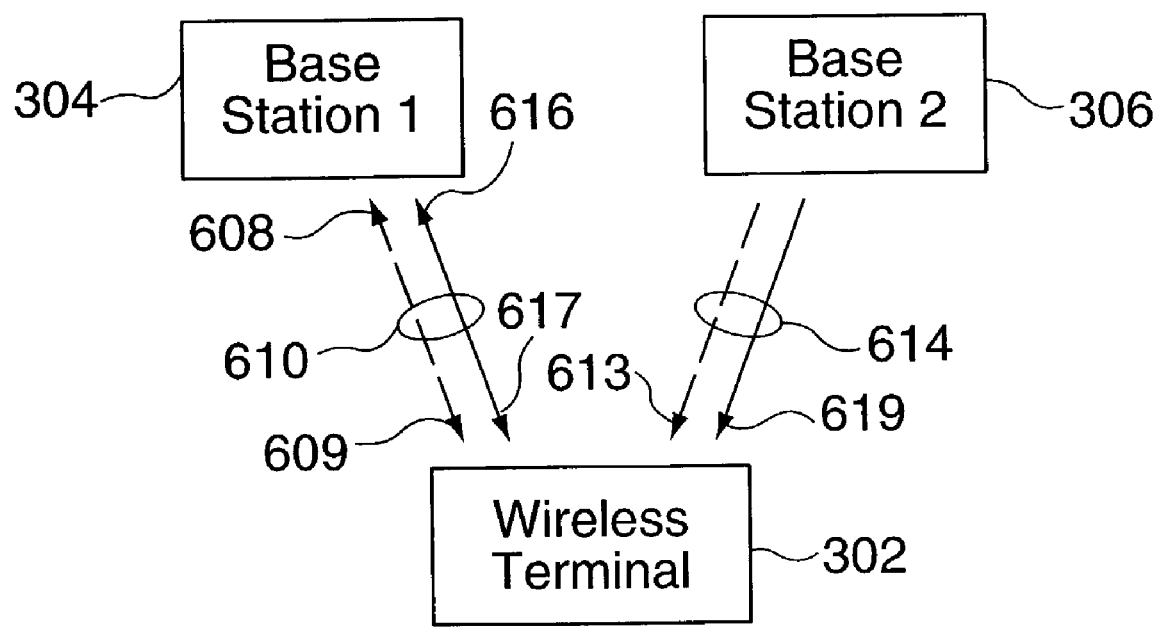

FIGS. 4-6 illustrates three embodiments of the present invention implemented with the base stations 1 and 2 304, 306 of communications system 300. Control flows are represented by dashed lines and data flows are represented by solid lines. Active downlinks or uplinks are represented by arrows heads in the appropriate direction, i.e., pointing towards the wireless terminal for downlinks and pointing towards the base station for uplinks.

In the first embodiment, illustrated in FIG. 4, the wireless terminal 302 has connections 410, 414 with first and second base stations 304, 306, respectively. Each connection 410, 414 includes a control uplink 408, 412 and a control downlink 409, 413, respectively. Each connection 410, 414 also includes a data uplink 416, 418 and a data downlink 41, 419, respectively. Accordingly, in the FIG. 4 example, bi-directional control and data communications is supported for communications with both base stations 304, 306.

In a second embodiment of the present invention, illustrated in FIG. 5, the wireless terminal 302 has connections 510, 514 with first and second base stations 304, 306, respectively. Each of the first and second connections 510, 514 includes a control uplink 508, 512 and a control downlink 509, 513, respectively. The first connection 510 also includes a data uplink 516 and a data downlink 517. The second connection 514 includes a data downlink 519 but no data uplink. Accordingly, in the FIG. 5 example, bi-directional control signaling is supported for both the connections with both base stations 304, 306, bi-directional data communication is supported with one base station 304 while downlink data communications is supported for the connection 514 with the second base station 306.

As illustrated in FIG. 5, base station 1 304 has both uplink (508, 516) and downlink (509, 517) connections with wireless terminal 502 which carry control and data flows. On the other hand, with base station 2 306, has both an uplink 512 and a downlink 513 connection for control flows, but only downlink connection 519 for data flows. In the FIG. 5 example, a single uplink is used by a device to transmit data at any given time despite the existence of multiple active uplinks any or all of which may be used to communicate control information.

In a third example of the present invention, illustrated in FIG. 6, at any given point in time, each of the wireless terminal's connections 610, 614 includes active control (609, 613) downlinks and active data (617, 619) downlinks, while a single one of the wireless terminal's connections 610 includes both an active control uplink 608 and active data uplink 616. In this manner, the wireless terminal can fully interact with one base station 304 at a given time but receive control and data signals from multiple base stations 304, 306.

For example wireless terminal 302 has an active control and data downlinks (609, 617) and uplinks (608, 616) with base station 1 304, thereby allowing bi-directional communication of both of the connection carry control and data flows. On the other hand for base station 2 306, the wireless terminal 302 has active downlinks 613, 619 for control and data flows, respectively, but no active uplink connection.

For a connections to be established, the wireless terminal 302 and the corresponding base stations 304, 306 to which the terminal 302 is to be connected are synchronized to each other, where the synchronization operation typically involves carrier frequency and symbol/frame timing synchronization. In the case where the base stations 304, 306 are not synchronized themselves, in accordance with the invention, the synchronization operations for individual connections 310, 312 are independently carried out.

Figure 7:
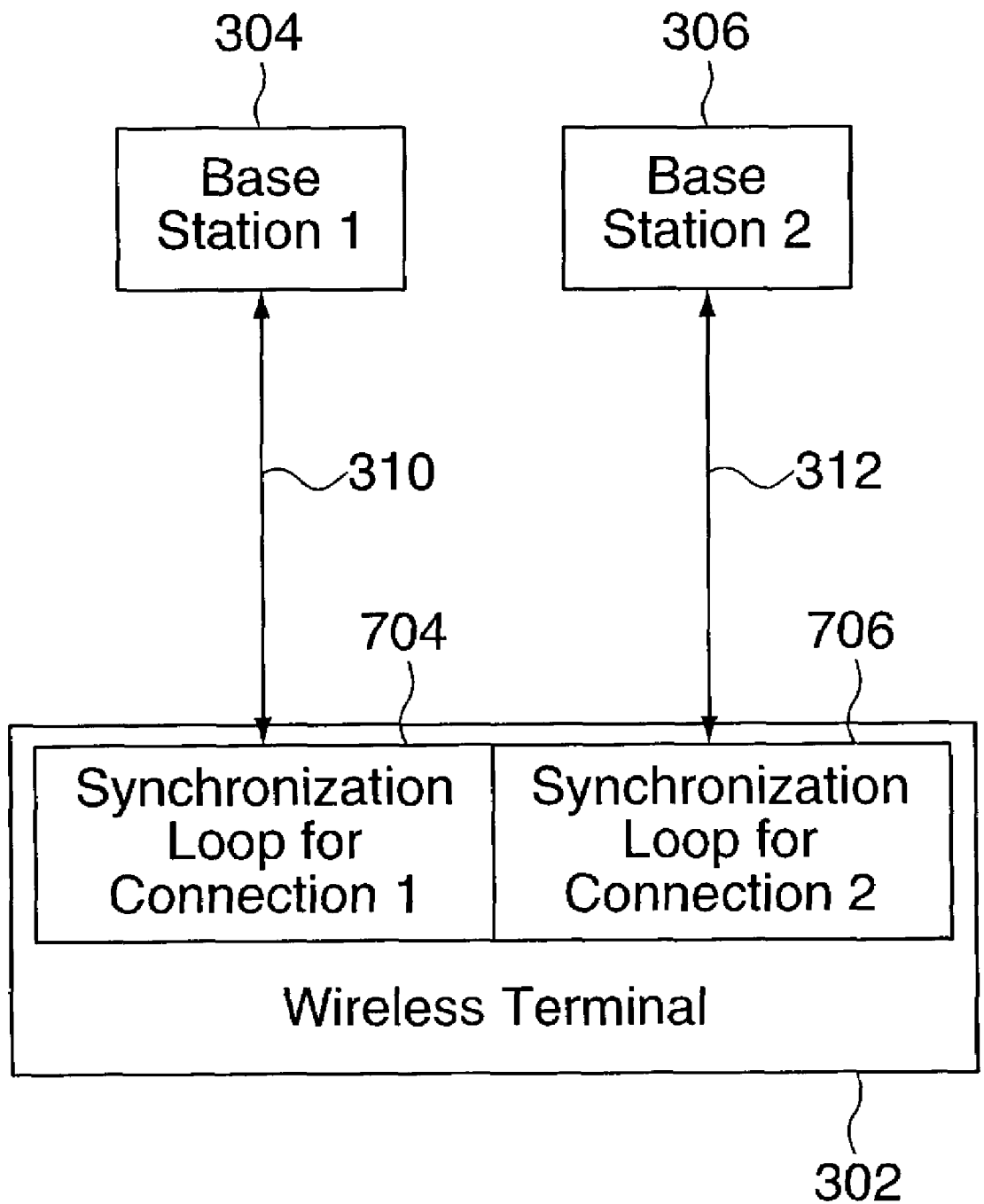
FIG. 7 illustrates presence of multiple separate synchronization loops, one for each base station with which the wireless terminal may interact at any given point in time.

Specifically, the carrier frequency and symbol/frame timing parameters at both transmitter and receiver of the wireless terminal 302 are independently set and/or tuned for individual connections 310, 312. FIG. 7 illustrates the use of separate synchronization control loops 704, 706 within the wireless transmitter 302 to insure proper, independent timing synchronization with each of the base stations 304, 306 to which the wireless terminal 302 is connected.

In the FIG. 7 example, wireless terminal 302 has first and second independent, e.g., asynchronous, connections 310, 312. The first connection 310 is with base station 1 304 while the second connection 312 is with base station 2 306. Since the base stations 304, 306 are not synchronized, the wireless terminal 302 maintains separate synchronization loops 704, 706 for each connection. Synchronization loop 1 704 is for the first connection 1 310 while the second synchronization loop 706 is for the second connection 312. While synchronization loops 704, 706 function independently, they may share some common hardware, e.g., analog receiver circuitry, used to receive signals corresponding to connections 310, 312 while independent digital processing may be used to perform all or a portion of the timing control implemented in each of the synchronization loops 704, 706.

Figure 8:
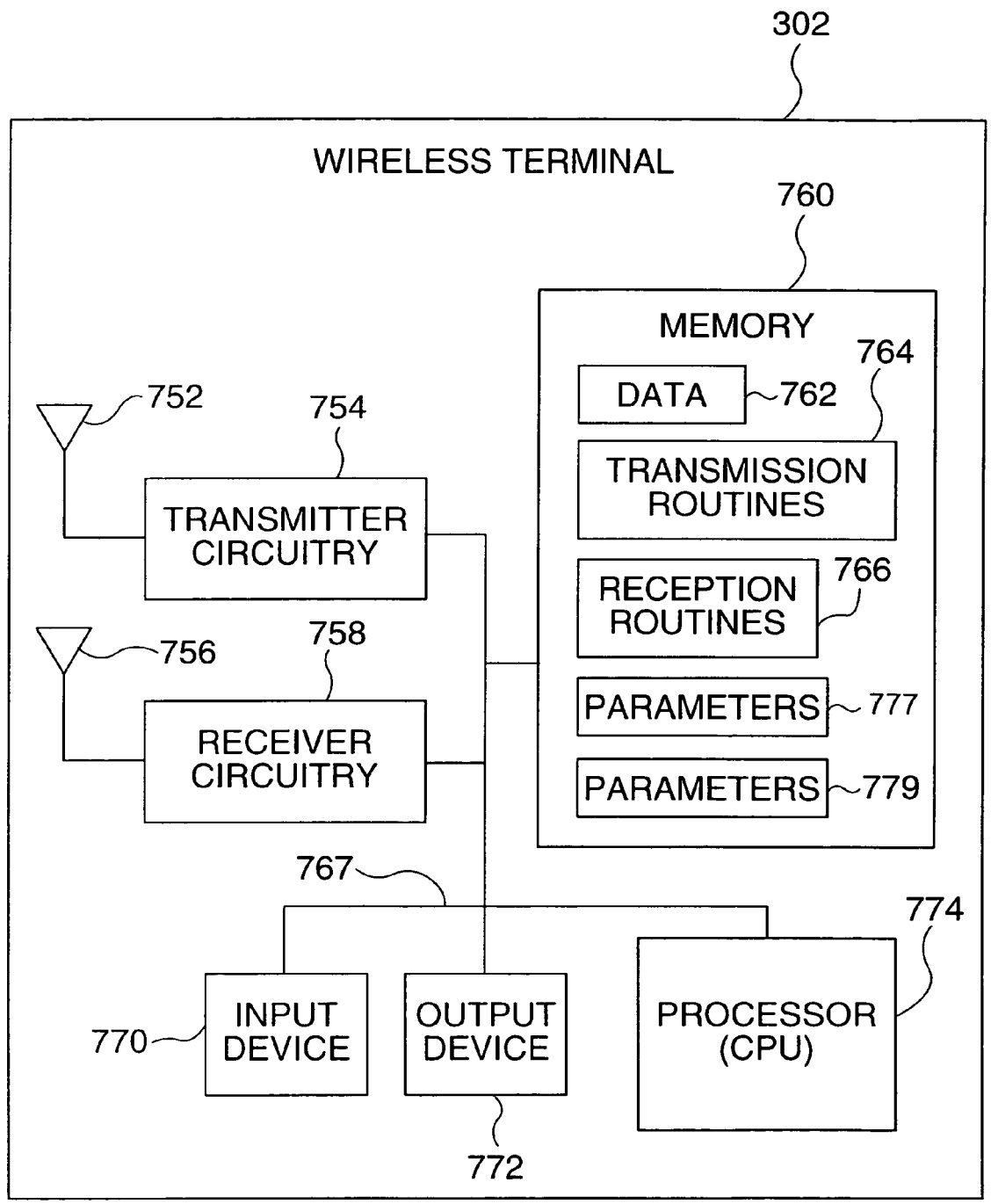
FIG. 8 is a block diagram showing an exemplary wireless terminal implemented in accordance with the present invention in greater detail.

FIG. 8 illustrates an exemplary wireless terminal 302 of the present invention in greater detail than the preceding figures. The wireless terminal includes a transmitter antenna 752 that it coupled to transmitter circuitry 754. It also includes a receiver antenna 756 that is coupled to receiver circuitry 758. Transmitter circuitry 754 receives digital control and data signals to be transmitted from bus 767. Receiver circuitry 758 generates digital control and data signals from received signals which are output over bus 767. Transmitter and receiver circuitry are responsive to timing, power control, and other signals received from other terminal components via bus 767.

Bus 767 couples various components of the wireless terminal together as shown in FIG. 8. The components that are coupled together include an input device 770, an output device 772, transmitter circuitry 754, receiver circuitry 758, a processor, e.g., CPU, 774 and memory 760. Input device may be, e.g., a keypad and/or microphone. Output device 772 may include a speaker and/or display device. Memory 760 includes data 760, e.g., voice, text, E-mail or other types of data, stored in the form of files, which has been received or is to be transmitted. The data may be stored as packets or packetized prior to transmission. Memory also includes transmission routines 764, reception routines 766 and different sets of parameters 777, 779 for each connection with a base station that is maintained. Transmission routines 764 and reception routines 766 are executed by processor 774 and control various transmission/reception operations. Transmission routines 764 may include a synchronization loop routine and a main digital processing routine that can be executed for each base station connection that is to be supported by the wireless terminal 302 at any given time to provide, when executed, a synchronization loop and a main digital processing module (see, e.g., FIG. 9). Similarly, reception routines 766 may also include a synchronization loop routine and a main digital processing routine that can be executed for each base station connection that is to be supported by the wireless terminal 302 at any given time to provide, when executed, a synchronization loop and a main digital processing module (see, e.g., FIG. 10).

Transmission routines 764 and reception routines 766 are executed by processor 774 and control various transmission/reception operations. Under control of the routines 764, 766 the processor circuitry 774 may is configured to operate as receiver and transmitter synchronization loop circuits and receiver/transmitter main digital processing modules. Alternatively, such circuits and/or modules may be implemented using dedicated hardware circuits.

Transmitter and receiver systems that use these multiple synchronization loops will now be described.

The wireless terminal 302 is equipped with multiple transmitter and receiver pairs, where each pair is dedicated for a particular connection. In one embodiment of the invention, individual transmitter/receiver pairs are constructed with separate device components. An exemplary transmitter system 800 is described with respect to FIG. 9 and an exemplary receiver system 900 is described with respect to FIG. 10.

Figure 9:
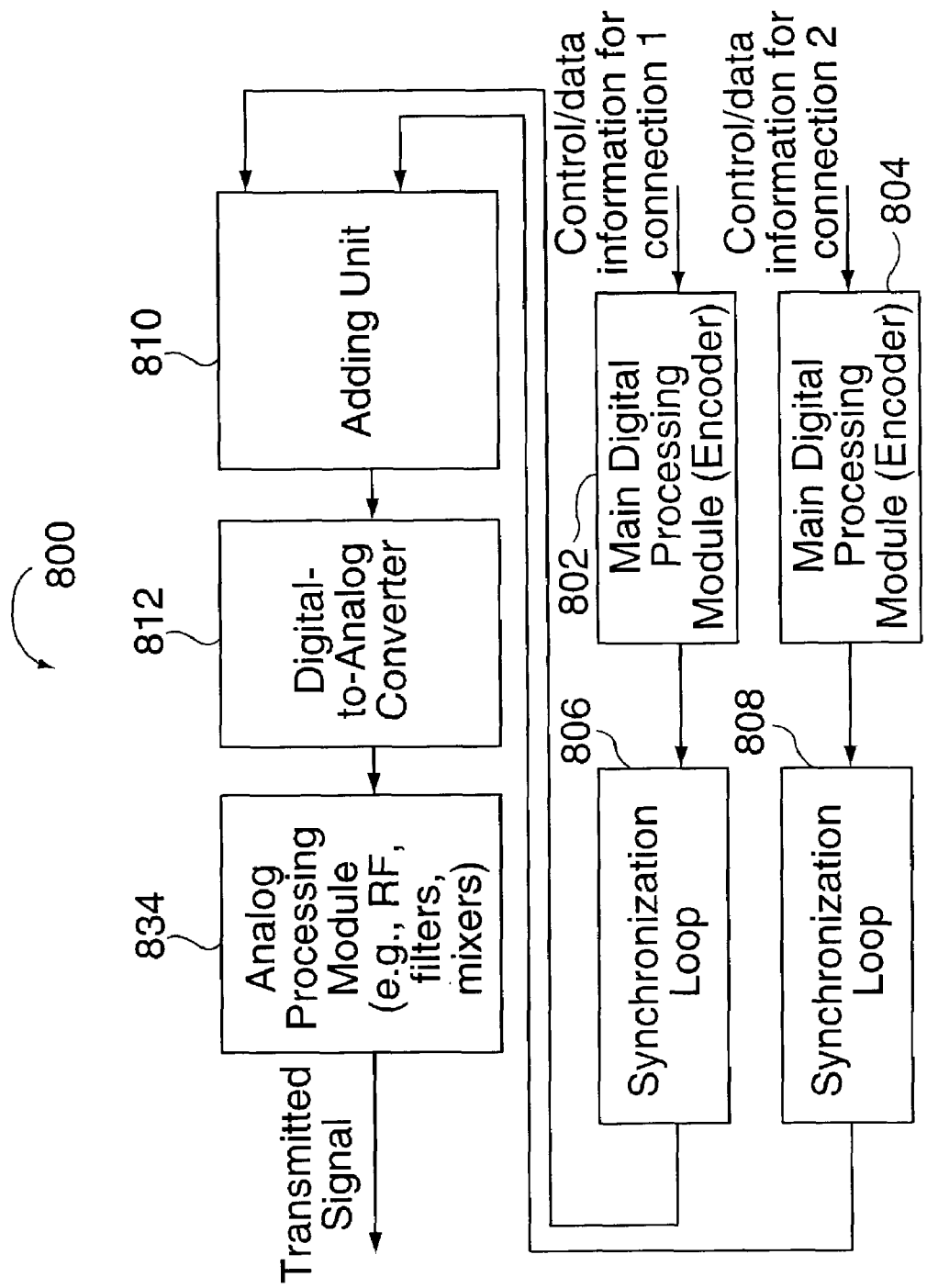
FIG. 9 illustrates transmitter circuitry which may be used as the transmitter circuitry of the wireless terminal of FIG. 8.

FIG. 9 illustrates wireless terminal components 800 used for transmitting signals to base stations in accordance with the present invention. The wireless terminal components 800 include an analog processing module 834, a Digital-to-Analog converter (DAC) 812, an adding unit 810, synchronization loops 806, 808 and main digital processing modules 802, 804, coupled together as shown in FIG. 9. Analog processing module 834, D/A converter 812 and adding unit 810 may be part of the transmitter circuitry 754 shown in FIG. 8. Synchronization loops 806, 808 and digital processing modules 802, 804 may be implemented by executing routines 764 on processor 774 or by using dedicated hardware circuits. Analog processing module 834 may include elements such as Radio Frequency (RF) and analog filters, analog mixers, etc. The signals transmitted to base stations 304 and 306 are processed by each of these circuits. However, such circuits could be duplicated for transmission to each of the base stations 304, 306 avoiding the need for adding unit 810 but requiring multiple modules 834 and D/A converters 812.

In an exemplary transmission operation, the digital signals corresponding to different base station connections are first generated, where each signal represents the control and/or data information to be sent on the corresponding connection. The signals may be generated by processor 774. In accordance with the invention, the digital signals to be transmitted to each base station are independently processed by separate main digital processing modules 802, 804 and synchronization loops 806, 808 used for processing signals directed to base station to which the signals are directed. In the FIG. 8 example, the digital signals to be transmitted over the different connections are further digitally processed, e.g., channel encoded, by main digital processing modules 802, 804.

Base stations may not be synchronized. Therefore, in accordance with the invention, for the synchronization purposes frequency and timing corrections are carried out independently, based on the synchronization parameters, using digital signal processing for the digital signals of individual connections. These frequency and timing correction are independently performed on a per base station connection basis by the synchronization loops 806, 808.

The separated digital signals to be transmitted to the base stations 304, 306 are then added and converted to a single analog signal by adding unit 810 and DAC 812, respectively. The information on the different connections is carried on separate communications channels, e.g., OFDM communications channels implemented using, e.g., different frequency tones. Therefore the adding unit 810 introduces minimal interface to the information to be sent when the information is combined. The converted analog signal is amplified and then transmitted over the wireless channel by analog processing module 834.

Figure 10:
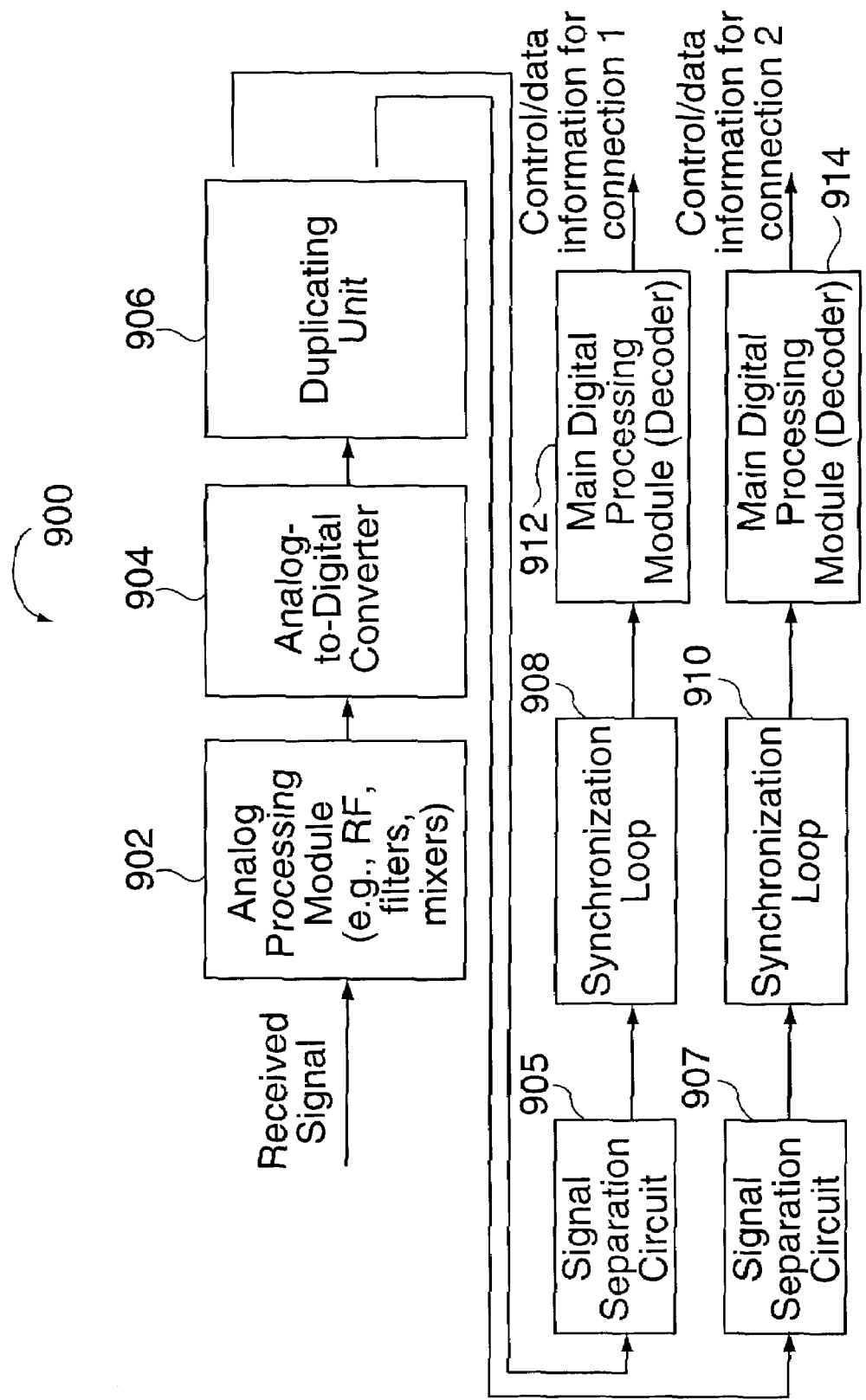
FIG. 10 illustrates receiver circuitry which may be used as the receiver circuitry of the wireless terminal of FIG. 8.

FIG. 10 illustrates wireless terminal components 900 used for receiving signals from base stations in accordance with the present invention. The wireless terminal components 900 include an analog processing module 902, an Analog-to-Digital converter (ADC) 904, a duplicating unit 906, signal separator circuits 905, 907, synchronization loops 908, 910 and main digital processing modules 912, 914, coupled together as shown in FIG. 10. Analog processing module 902 may include elements such as Radio Frequency (RF) and analog filters, analog mixers, etc. Analog processing module 902, A/D converter 904 duplicating unit 906, and signal separator circuits 905, 907 may be implemented as part of the receiver circuitry 758. Synchronization loops 908, 910 and digital processing modules 912, 914 may be implemented by executing routines 766 on processor 774 or by using dedicated hardware circuits.

In exemplary receiver operation, received signals, e.g., analog signals, are first processed by analog device components, e.g., analog filters, amplifiers, by analog processing module 902. Then, the processed signal is converted to a single digital signal by ADC 904. The digital signal is then duplicated, by duplicating unit 906, to form multiple copies of the same digital signal. Each of the multiple copies of digital signals is further processed on a per base station connection.

In accordance with the invention, the receiver system 900 includes separate signal separator circuits 905, 907, synchronization loops 908, 910 and main digital processing modules 912, 914 for each of its base station 310, 312 connections. For synchronization purposes frequency and timing corrections are independently carried out for the digital signals of individual connections based on synchronization parameters and by performing digital signal processing operations after signal separation is done by one of circuits 905, 907. In this example, the separation of the corresponding connections is carried out in the digital domain.

The signal separation, timing synchronization and decoding operations are performed by signal separation circuit 905, 907, the synchronization loop 908, 910 and the main digital processing module 912, 914, corresponding to each base station connection. Accordingly signals corresponding to different base stations are processed independently in the digital domain.

The main digital processing performed by modules 912, 914 may include, e.g., channel decoding operations. As the result of decoding performed by modules 912, 914 the transmitted data and/or control signals corresponding to each individual base station are separately recovered. The recovered control and/or data information is stored in the memory 760 and/or subject to further processing by processor 774.

In accordance with various implementations of the present invention, a plurality of transmitter/receiver pairs can share the same analog device components, such as Radio Frequency (RF) and analog filters.

One situation where a wireless terminal 302 may maintain connections with multiple base stations is during a handoff operation. In accordance with the invention, when a wireless terminal 302 is performing a handoff operation, it maintains multiple simultaneous independent connections with the base stations 304, 306 in the neighboring area. An exemplary handoff operation will now be discussed with respect to the communication system of FIG. 3.

Wireless terminals may move and, as a result, encounter new base stations within their transmission range. When a wireless terminal 302 detects the presence of a new base station, e.g., base station 2 306, and determines the new base station 306 is a handoff candidate, it establishes a new connection with the new base station 306. This is done by either directly communicating with the new base station 306, e.g., providing device specific connection setup information to the new base station 306 and/or by indirectly communicating with the new base station, e.g., having the current serving base station 304 inform the new base station 306 of the presence or wireless terminal 302 in the new base station's coverage area.

Preferably, in the handoff operation, the new connection is established before the connection with the current base station 304 goes down, resulting in the make-before-break feature of the handoff operation. The make-before-break feature effectively reduces or even eliminates the data loss and latency that might otherwise occur during a handoff.

FIGS. 11-14 illustrate the connections established as part of a make-before-break handoff operation of the present invention. In the example in FIGS. 11-14 bi-directional control and data communications links are supported. The wireless terminal maintains an active uplink for each base station with which it communications. The uplinks are used to transmit control information, such as power control and link layer acknowledgment, to individual base stations. In accordance with the invention, those pieces of control information can be different for different base stations.

Figure 11:
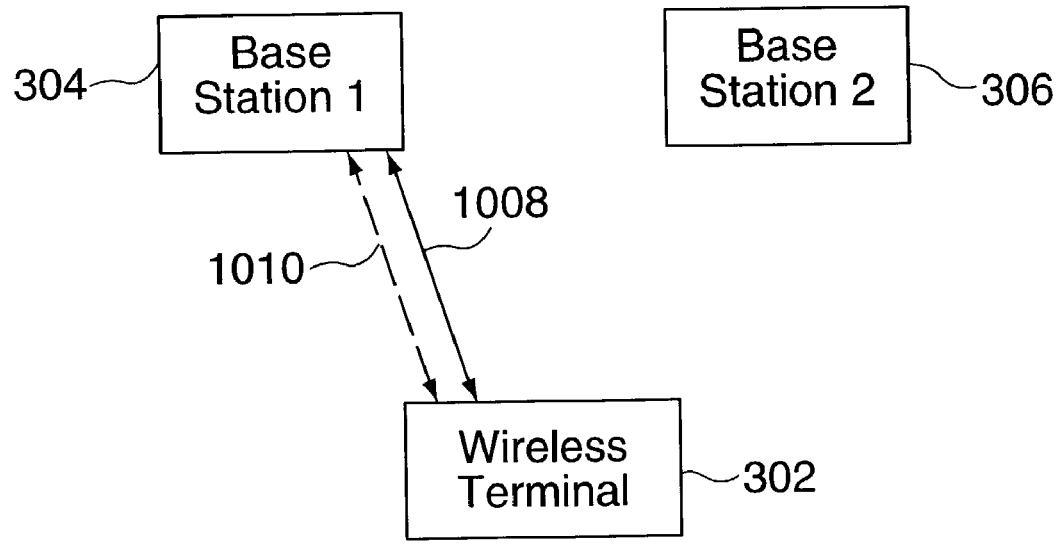
FIGS. 11-14 illustrate the signaling and connections established as part of a make before break operation performed in accordance with the present invention.

FIG. 11 illustrates step 1 of a handoff. In this step, the wireless terminal 302 has one connection to a base station, e.g., the first base station 304. The connection carries control information on link 1010 and data information on link 1008 in both uplink and downlink directions.

As the wireless terminal 302 moves closer to base station 2 306, in step 2, the wireless terminal 302 decides to add base station 2 306 as a handoff candidate. Therefore, as illustrated in FIG. 12, the wireless terminal 302 establishes and maintains two connections, one with the first base station 304 and another with the second base station 306.

In accordance with the present invention the two connections are independently operated. For this exemplary embodiment, in the downlink, different data packets and control information are received from each of the first and second base stations 304, 306. The data packets received by the different base stations 304, 306 may be different parts of the same file or message, e.g., voice E-mail or text message, which is being transmitted. In the uplink, control information is transmitted to both base stations 304, 306, as represented by the upward facing arrowheads on arrows 1010 and 1112. The control information transmitted to different base stations 304, 306 can be different, e.g., since the base stations may not be synchronized. That is, in some embodiments, different symbol transmission start times are used by each base station 304, 306 requiring different symbol timing synchronization to be performed in regard to signals exchanged with the different base stations 304, 306.

Figure 12:
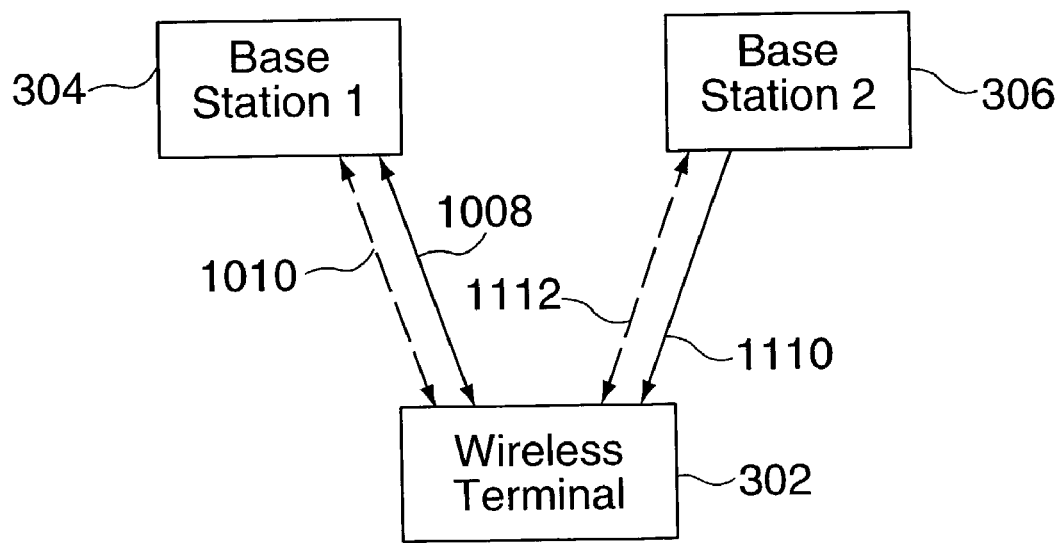

In the example shown in FIG. 12, data packets, are transmitted from the wireless terminal to a single base station, e.g., the first base station 304, at any given time. The single base station to which the wireless terminal 302 transmits its uplink data flow is preferably the one having the best wireless channel condition. For example, suppose that base station 1 304 has the best wireless channel condition. Therefore, the wireless terminal 302 will transmit the data packets through the link connection 1008 to the base station 304.

Now suppose that the wireless channel condition of second base station 306 becomes better than that of first base station 304. The wireless terminal 302 will switch to the second base station 306 for data transmission purposes and will transmit the data packets through the connection with the second base station 306 instead of the connection with first base station 304.

When making the switch there can be an overlapping period of time. In this time the benefits of having two connections are evident. For example, the wireless terminal 302 may continue to transmit its data flows to first base station 304 in order to finish serving the data packets, which are in the middle of transmission, while the data flows of new, different data packets to the second base station 306, also start. The different data packets transmitted to the first and second base stations 304, 306 may include, e.g., IP packets representing different portions of the same message or file. The simultaneous data transmissions to two base stations 304, 306 is possible because the two connections are over two different communications channels. Alternatively, the wireless terminal 302 can first finish serving the data packets that are in the middle of transmission to the first base station 304, and then start the data flows of new data packets to second base station 2 306.

Figure 13:
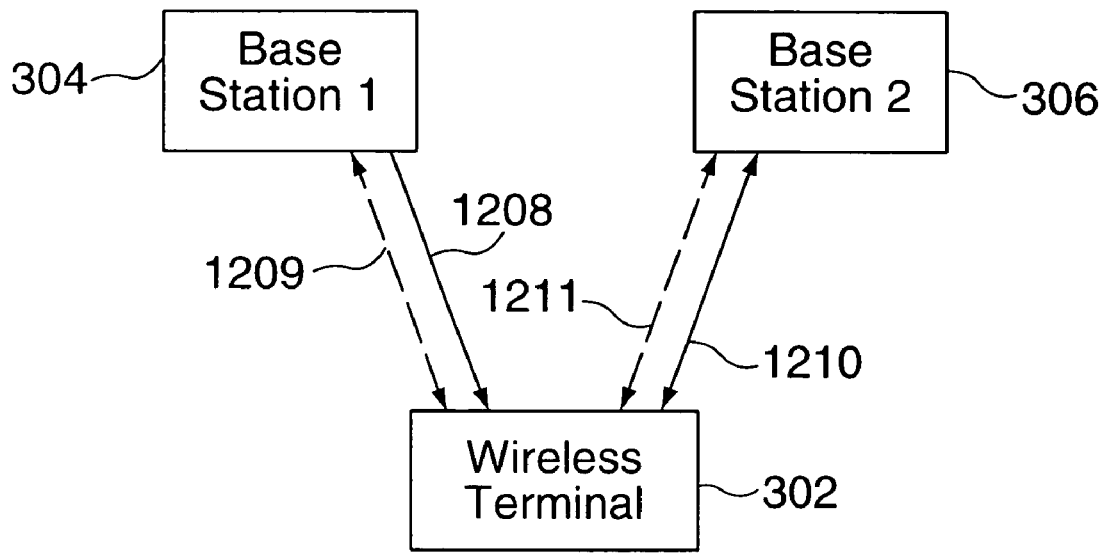

As channel conditions for the connection to the second base station 306 improve over channel conditions for the connection to the first base station 304, e.g., as the wireless terminal moves from one cell to another, in a third step, the wireless terminal 302 will initiate a switch of its data flow from the first base station 304 to the second base station 306. This results in connections and signal flows as illustrated in FIG. 13. In FIG. 13, the wireless terminal's uplink data flow connection with the first base station 304 has been terminated and wireless terminal 302 has formed an uplink data flow connection 1210 with the second base station 306. Accordingly, with the start of the transmission of data to the second base station 306, the flow of data to the first base station 304 will stop. In this embodiment, at a given time, a single uplink connection is used to carry the data flow, while all active uplink connections carry the control flows. Active uplink control flows are represented in FIG. 13 by upward facing arrowheads on connections 1209 and 1211.

Figure 14:
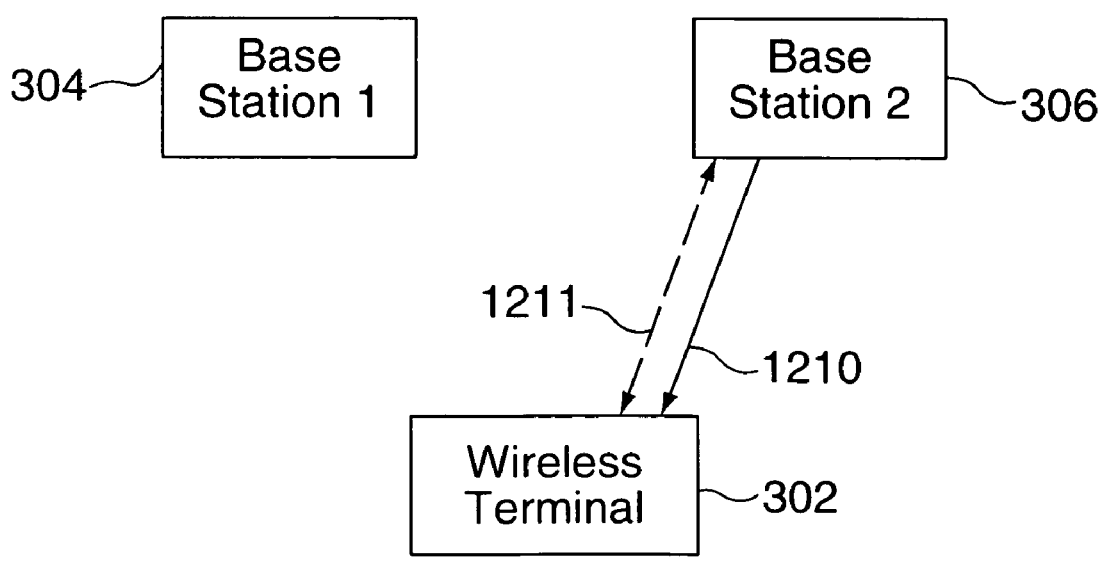

As the wireless terminal 302 moves out of range of the first base station 304, the corresponding connection 1208, 1209 is torn down in step 4 of a handoff of the present invention. As a result, as shown in FIG. 14, the wireless terminal 302 will have one connection 1210, 1211 to the second base station 306. Thus, at the end of the handoff operation, the mobile node 302 will have a single connection with the a base station.

The make-before-break handoff is fundamentally different from the soft handoff, in that the multiple simultaneous connections between a wireless terminal and different base stations are independent and that they carry different control and./or data information. In accordance with the invention, the connections with both the current and the new base stations are independently operated.

Specifically, in the physical layer, and in the wireless terminal's memory 760, the wireless terminal maintains separate sets of transmitter/receiver synchronization parameters 777, 779 for the different connections. Moreover, in the upper layers, the pieces of information carried on the connections for different base stations may be different. In the downlink direction, the data and control flows from the base stations to the wireless terminal may contain different pieces of information. For example, the base stations can, and in various embodiments do, send different independent data packets to the wireless terminal simultaneously. Similarly, in the uplink direction, the data and control flows from the wireless terminal to the base stations may also include different pieces of information.

The steps of the various methods of the present invention may be implemented in a variety of ways, e.g., using software, hardware or a combination of software and hardware to perform each individual step or combination of steps discussed. Various embodiments of the present invention include means for performing the steps of the various methods. Each means may be implemented using software, hardware, e.g., circuits, or a combination of software and hardware. When software is used, the means for performing a step may also include circuitry such as a processor for executing the software. Accordingly, the present invention is directed to, among other things, computer executable instructions such as software for controlling a machine or circuit to perform one or more of the steps or signal processing operations discussed.

The timing synchronization loops of the present invention may be implemented using various techniques and/or circuits. U.S. patent application Ser. No. 10/090,871 filed Mar. 4, 2002 titled "Method of Symbol Timing Synchronization in Communication Systems" and U.S. patent application Ser. No. 09/503,040 filed Feb. 11, 2000, both of which are hereby expressly incorporated by reference, describe various timing synchronization circuits and techniques that may be used to implement the timing loops used in a wireless terminal of the present invention. However, alternative techniques and/or circuits may be used.

It is to be understood that numerous variations on the above described methods and apparatus are possible without departing from the scope of the invention. For example, the invention was explained in terms of a wireless terminal establishing connections with two base stations. In accordance with the invention simultaneous connections between a wireless terminal and any number of base stations may be established and maintained. In addition, embodiments where a wireless terminal (302) supports multiple data uplinks with different base stations (304, 306) at the same time but a single data downlink at any given time are contemplated. Such data links would be in addition to control links, e.g., bidirectional control links, with both base stations. Such an implementation would be similar to the one shown in FIG. 5 but with the arrow 519 reversed to represent an uplink instead of a downlink.

It is also to be understood that while the methods and apparatus of the present invention are suitable for orthogonal frequency division multiplexed (OFDM) applications, they can be used with other communications techniques as well and are not limited to OFDM systems.

What is claimed is:

1. A mobile communications device for communicating, in parallel with a plurality of base stations each operating with different signal timing, the communications device comprising:
   a plurality of receiver timing synchronization loops capable of establishing, in parallel, timing synchronization with said plurality of base stations, said receiver timing synchronization loops being used to adjust receiver timing in said mobile communications device.

2. The mobile communications device of claim 1, wherein said plurality of receiver timing synchronization loops are receiver symbol timing loops.

3. The mobile communications device of claim 1, further comprising:
   control means for controlling the transmission of different portions of a data file to different base stations at the same time.

4. The mobile communications device of claim 1, further comprising:
   a plurality of signal separation circuits, a different signal separation circuit being coupled to each one of said plurality of receiver timing synchronization loops for separating signals corresponding to different base stations, such that signals corresponding to different base stations will be processed by different receiver timing synchronization loops.

5. The mobile communications device of claim 4, further comprising:
   an analog receiver circuit for receiving an input analog signal corresponding to signals transmitted by multiple base stations; and
   an analog to digital converter coupled to said analog receiver circuit and said signal separation circuits.

6. The mobile communications device of claim 5, wherein the signals transmitted by each base station are orthogonal frequency division multiplexed signals; and
   wherein said signal separation circuits are filters which filter out the tones corresponding to base stations which are not to be processed by the receiver timing synchronization loop to which the particular signal separation circuit is coupled.

7. The apparatus of claim 1, wherein each of said plurality of receiver timing synchronization loops corresponds to a communications link with a different base station, said base stations being asynchronous, the apparatus further comprising:
   memory storing different sets of transmitter and receiver synchronization parameters, different sets of transmitter and receiver synchronization parameters corresponding to communications links with different base stations.

8. A mobile communications device for communicating, in parallel with a plurality of base stations each operating with different signal timing, the communications device comprising:
   a plurality of timing synchronization loops capable of establishing, in parallel, timing synchronization with said plurality of base stations; and
   wherein said plurality of timing synchronization loops include receiver timing synchronization loops and transmitter timing synchronization loops, a plurality of said transmitter timing synchronization loops and a plurality of said receiver timing synchronization loops being used in parallel, at least one receiver timing synchronization loop and one transmitter timing synchronization loop being used for each base station with which said mobile communications device establishes a communications connection.

9. The mobile communications device of claim 8, further comprising:
   a plurality of encoder circuits, a different one of said plurality of encoder circuits being coupled to each of said plurality of transmitter timing synchronization loops.

10. The mobile communications device of claim 9, wherein each of said plurality of encoders encodes data corresponding to connections to different base stations.

11. The mobile communications device of claim 10, further comprising:
    a digital combining device coupled to said plurality of transmitter timing synchronization loops for combining data processed by said transmitter timing synchronization loops to thereby generate a combined digital signal.

12. The mobile communications device of claim 11, further comprising:
    a digital to analog converter for converting said combined digital signal into an analog transmission signal; and
    an analog transmission circuit for transmitting said analog transmission signal.

13. The mobile communications device of claim 8, further comprising:
a plurality of decoder circuits, a different one of said plurality of decoder circuits being coupled to each of said plurality of receiver timing synchronization loops.

14. The mobile communications device of claim 13, wherein each of said plurality of decoder circuits decodes data corresponding to connections to different base stations.

15. The mobile communications device of claim 8, further comprising:
a plurality of signal separation circuits, a different signal separation circuit being coupled to each one of said plurality of receiver timing synchronization loops for separating signals corresponding to different base stations, such that signals corresponding to different base stations will be processed by different receiver timing synchronization loops.

16. The mobile communications device of claim 15, further comprising:
an analog receiver circuit for receiving an input analog signal corresponding to signals transmitted by multiple base stations; and
an analog to digital converter coupled to said analog receiver circuit and said signal separation circuits.

17. The mobile communications device of claim 16, wherein the signals transmitted by each base station are orthogonal frequency division multiplexed signals; and
wherein said signal separation circuits are filters which filter out the tones corresponding to base stations which are not to be processed by the receiver timing synchronization loop to which the particular signal separation circuit is coupled.

18. The mobile communications device of claim 8, wherein said plurality of receiver timing synchronization loops are receiver symbol timing loops.

19. A method of operating a wireless terminal to interact with a plurality of base stations including a first base station and a second base station, comprising:
performing a first receiver timing synchronization operation to synchronize data signal receiver timing with the first base station; and
performing a second receiver timing synchronization operation to synchronize data signal receiver timing with the second base station, the first and second timing synchronization operations being performed independently and in parallel.

20. The method of claim 19,
wherein said step of performing first timing synchronization operation includes receiving timing control signals from the first base station over a first control link; and
wherein said step of performing second timing synchronization operation includes receiving timing control signals from the second base station over a second control link.

21. The method of claim 20, wherein said first and second timing synchronization operations are symbol timing synchronization operations.

22. The method of claim 20, further comprising:
transmitting first data to the first base station; and
in parallel with transmitting the first data to the first base station, transmitting second data to the second base station.

23. The method of claim 22, wherein said first and second data are different parts of a single data file.

24. The method of claim 23, wherein said data file is one of an E-mail file, an image file and a text file.

25. The method of claim 24,
wherein said first data is stored in a first data packet and said second data is stored in a second data packet; and
wherein transmission of said second data packet to said second base station begins during transmission of said first data packet to said first base station.

26. The method of claim 25, further comprising:
ceasing the transmission of data to said first base station after transmission of said first data packet is completed while continuing to transmit data to said second base station.

27. The method of claim 19, further comprising:
receiving an analog signal, said analog signal including signals from said first and second base stations;
performing an analog to digital conversion operation on said analog signal;
separating signals corresponding to said first and second base stations by processing the output of said analog to digital conversion operation; and performing independent frequency correction operations on the separated signals received from said first and second base stations.

28. A method of implementing a handoff between base stations of a communications system, the method comprising:
communicating with a first base station;
establishing a connection with a second base station;
transmitting, in parallel, different data in different communications signals which are transmitted in parallel to said first and second base stations, respectively; and
using different symbol transmission start times when transmitting symbols representing at least portions of said first and second data packets to said first and second base stations.

29. The method of claim 28,
wherein said different data in different communications signals are different data packets representing packets of digital data; and
wherein said step of transmitting different data to said first and second base stations includes transmitting a first data packet to said first base station and transmitting a second data packet to said second base station, each of the first and second data packets including different data from a set of data to be transmitted.

30. The method of claim 29, wherein said set of data to be transmitted is one of an E-mail message, a voice message, and a text message.

31. The method of claim 28, wherein said set of data to be transmitted is one of an E-mail message, a voice message, and a text message.

32. The method of claim 31, further comprising:
monitoring the quality of the connections with the first and second base stations; and
ceasing to transmit data to the lower quality connection.

33. The method of claim 31, further comprising:
monitoring the quality of the connections with the first and second base stations; and
changing the base station to which data is transmitted when the quality of the connection being used to transmit data becomes worse than the quality of the data connection to the base station to which data was not being transmitted.

34. The method of claim 28, wherein transmitting, in parallel, different data in different communications signals includes transmitting data corresponding to different data packets of a file, at least one data packet corresponding to said file being communicated to the first base station not being communicated to the second base station.

35. The method of claim 34, wherein said at least one data packet is being transmitted to the first base station while transmission of another data packet corresponding to the file is initiated to said second base station.

36. A method of implementing a communications system, the method comprising:
provifing a plurality of base stations for interacting with a mobile communications device;
operating at least a first and second base station in said plurality of base stations to receive, in parallel, different data from said mobile communications device to be transmitted over a wired asynchronous communications network; and
operating the first and second base stations to supply said received data to said wired asynchronous network; and
operating the first and second base stations to perform independent asynchronous symbol timing synchronization operations with said mobile communications device.

37. The method of claim 36, wherein said different data includes at least a portion of a first data packet transmitted by said first base station and a second data packet transmitted by said second base station.

38. The method of claim 37, wherein said first and second data packets correspond to different portions of at least one of an E-mail message, a voice message and a text message being transmitted by said wireless terminal.

39. The method of claim 38, wherein said communications system is an OFDM communications system.

40. A mobile communications device for communicating, in parallel with a plurality of base stations each operating with different signal timing, the communications device comprising:
analog to digital signal conversion means; and
a plurality of receiver timing synchronization means capable of establishing, in parallel, timing synchronization with said plurality of base stations, said receiver timing synchronization means being used to adjust receiver timing in said mobile communications device, said plurality of receiver timing conversion means being coupled to a digital signal output of said analog to digital signal conversion means.

41. A mobile communications device for communicating, in parallel with a plurality of base stations each operating with different signal timing, the communications device comprising:
a plurality of timing synchronization means capable of establishing, in parallel, timing synchronization with said plurality of base stations; and
wherein said plurality of timing synchronization means each include receiver timing synchronization means and transmitter timing synchronization means, a plurality of said transmitter timing synchronization means and a plurality of said receiver timing synchronization means being used in parallel, at least one receiver timing synchronization means and one transmitter timing synchronization means being used for each base station with which said mobile communications device establishes a communications connection.

42. A computer readable medium embodying computer executable instructions for controlling a communications device to implement a communications method of interacting with a plurality of base stations including a first base station and a second base station, the method comprising:
performing a first receiver timing synchronization operation to synchronize data signal receiver timing with the first base station; and
performing a second receiver timing synchronization operation to synchronize data signal receiver timing with the second base station, the first and second timing synchronization operations being performed independently and in parallel.

43. A device including a processor configured to implement a method of interacting with a plurality of base stations including a first base station and a second base station, the processor being configured to:
perform a first receiver timing synchronization operation to synchronize data signal receiver timing with the first base station; and
perform a second receiver timing synchronization operation to synchronize data signal receiver timing with the second base station, the first and second timing synchronization operations being performed independently and in parallel.

44. A computer readable medium embodying computer executable instructions for controlling a communications device to implement a method of implementing a handoff between base stations of a communications system, the method comprising:
communicating with a first base station;
establishing a connection with a second base station
transmitting, in parallel, different data in different communications signals which are transmitted in parallel to said first and second base stations, respectively; and
using different symbol transmission start times when transmitting symbols representing at least portions of said first and second data packets to said first and second base stations.

45. A device including a processor configured to implement a method of implementing a handoff between base stations of a communications System, the processor being configured to control the device to:
communicate with a first base station;
establish a connection with a second base station
transmit, in parallel, different data in different communications signals which are transmitted in parallel to said first and second base stations, respectively; and
use different symbol transmission start times when transmitting symbols representing at least portions of said first and second data packets to said first and second base stations.

* * * * *